(12) United States Patent
Furukawa et al.

(10) Patent No.: US 11,070,113 B2
(45) Date of Patent: Jul. 20, 2021

(54) ELECTRIC ROTATING MACHINE

(71) Applicant: Mitsubishi Electric Corporation, Tokyo (JP)

(72) Inventors: Akira Furukawa, Tokyo (JP); Akihiko Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 465 days.

(21) Appl. No.: 16/071,132

(22) PCT Filed: Apr. 22, 2016

(86) PCT No.: PCT/JP2016/062732
§ 371 (c)(1),
(2) Date: Jul. 19, 2018

(87) PCT Pub. No.: WO2017/183176
PCT Pub. Date: Oct. 26, 2017

(65) Prior Publication Data
US 2021/0175781 A1   Jun. 10, 2021

(51) Int. Cl.
*H02K 11/215* (2016.01)
*H02K 29/08* (2006.01)
*H02K 5/173* (2006.01)

(52) U.S. Cl.
CPC ......... *H02K 11/215* (2016.01); *H02K 5/1732* (2013.01); *H02K 29/08* (2013.01); *H02K 2213/03* (2013.01)

(58) Field of Classification Search
CPC .... H02K 11/215; H02K 29/08; H02K 5/1732; H02K 2213/03
(Continued)

(56) References Cited

U.S. PATENT DOCUMENTS 9,577,496 B2 * 2/2017 Kato ................. H02K 21/16
10,673,291 B2 * 6/2020 Oikawa .............. H02K 21/16
(Continued)

FOREIGN PATENT DOCUMENTS

JP    3738966 B2    1/2006

OTHER PUBLICATIONS

International Search Report for PCT/JP2016/062732 dated Aug. 2, 2016.
(Continued)

*Primary Examiner* — John K Kim
(74) *Attorney, Agent, or Firm* — Sughrue Mion, PLLC; Richard C. Turner

(57) ABSTRACT

In an electric rotating machine including an output shaft, a magnetic body fixed inside a case surrounding the output shaft, a sensor magnet fixed to the output shaft and generating a magnetic field for detecting a rotational angle of the output shaft and a rotation sensor fixed inside the case, arranged between the magnetic body and the sensor magnet in an axial direction of the output shaft and outputting a signal in accordance with the intensity of the magnetic field for detecting the rotational angle, N-pole and S-pole are magnetized in a circumferential direction around the output shaft in the sensor magnet and the rotation sensor is arranged in an area in which amplitudes of a radial-direction component Br around the output shaft and a circumferential-direction component Bθ in a magnetic flux density B of the magnetic field are equivalent.

13 Claims, 11 Drawing Sheets

(58) Field of Classification Search
USPC .......................................................... 310/68 B
See application file for complete search history.

(56) References Cited

U.S. PATENT DOCUMENTS

2019/0207470 A1\* 7/2019 Uematsu .................... F16H 1/32
2019/0265070 A1\* 8/2019 Hori ..................... H02K 11/215

OTHER PUBLICATIONS

Communication dated Mar. 25, 2019 from European Patent Office in counterpart EP Application No. 16899448.1.

\* cited by examiner

ELECTRIC ROTATING MACHINE

CROSS REFERENCE TO RELATED APPLICATIONS

This application is a National Stage of International Application No. PCT/JP2016/062732 filed Apr. 22, 2016.

TECHNICAL FIELD

The present invention relates to an electric rotating machine provided with a rotation sensor for detecting a rotational angle of an output shaft.

BACKGROUND ART

As a related-art electric rotating machine, for example, an apparatus in which a rotation sensor is mounted on an electric motor of an electric power steering device for a vehicle is known. An apparatus in which a control unit that calculates a rotational position and a rotational angle from a rotation signal detected by the rotation sensor is integrated with the electric rotation machine is also known. In the electric rotating machine in which the rotation sensor and the control unit are integrated, problems of suppressing noise and improving rotation accuracy are generated due to reduction in size and weight of the entire apparatus (for example, refer to Patent Literature 1).

CITATION LIST

Patent Literature

[Patent Literature 1] Japanese Patent No. 3738966

SUMMARY OF INVENTION

Technical Problem

There is description concerning positioning of a ring magnet (sensor magnet) and a hall element (rotation sensor) of an electric rotating machine in Patent Literature 1. In this structure, the ring magnet is attached to the close vicinity of a stator coil, and the hall element is attached to a bushing. The ring magnet and the hall element are arranged so as to face each other with a slight gap therebetween. In the structure of the apparatus disclosed in Patent Literature 1, the ring magnet and the hall element are arranged in the close vicinity and closely contact peripheral members to reduce the size.

Also in the structure disclosed in Patent Literature 1, a magnetic flux density from the ring magnet to a magnetic bypass member in an axial direction is detected, and it is necessary to perform detection at plural positions. As detection accuracy of the rotational angle is determined by positional accuracy of the hall element in the above case, it is necessary to manage the positional accuracy of the plural hall elements.

The present invention has been made for solving the above problems and an object thereof is to provide an electric rotating machine in which arrangement of the rotation sensor for detecting the rotational angle of the output shaft is optimized.

Solution to Problem

An electric rotating machine according to the invention includes an output shaft of the electric rotating machine, a magnetic body fixed inside a case of the electric rotating machine surrounding the output shaft, a sensor magnet fixed to the output shaft and generating a magnetic field for detecting a rotational angle of the output shaft and a rotation sensor fixed inside the case of the electric rotating machine, arranged between the magnetic body and the sensor magnet in an axial direction of the output shaft and outputting a signal in accordance with the intensity of the magnetic field for detecting the rotational angle, in which N-pole and S-pole are magnetized in a circumferential direction around the output shaft in the sensor magnet, and the rotation sensor is arranged in an area in which, when an amplitude ratio between a radial-direction component and a circumferential-direction component around the output shaft in a magnetic flux density of the magnetic field is "k", an n-order ("n" is an even number) angle error fn (k) expressed by the amplitude ratio "k" satisfies a required rotational angle detection accuracy E.

Advantageous Effects of Invention

In the electric rotating machine according to the invention, it is possible to suppress the difference in a basic wave amplitude of the radial-direction component and the circumferential-direction component in the magnetic flux density of the magnetic field generated by the sensor magnet and the magnetic body, thereby improving rotational angle detection accuracy of the output shaft.

Objects, features, viewpoints and advantages other than the above in the invention will be further cleared from the following detailed description of the present invention with reference to the drawings.

DESCRIPTION OF EMBODIMENTS

Embodiment 1

An electric rotating machine according to Embodiment 1 of the present invention has a structure in which a motor and a control unit are integrated, including a rotation sensor for detecting a rotational angle of an output shaft. Then, a magnetic flux density of a magnetic field generated between a sensor magnet and a magnetic body is measured and the rotational angle of the output shaft is detected by one rotation sensor. In the case where the rotational angle of the output shaft is detected by one rotation sensor, the rotational angle can be calculated from a relation between a radial-direction component of the magnetic flux density and a circumferential-direction component of the magnetic flux density around the output shaft. However, when an amplitude ratio between the radial-direction component and the circumferential-direction component of the magnetic flux density is shifted from "1", an angle error occurs in an output value of the rotation sensor in accordance with the shift.

Accordingly, in the electric rotating machine according to the present invention, it is proposed that the rotation sensor is arranged in an area in which a shift amount in the amplitude ratio between the radial-direction component and the circumferential-direction component of the magnetic flux density can be reduced for reducing the error in the detected rotational angle.

Hereinafter, the electric rotating machine according to Embodiment 1 of the present invention will be explained with reference to FIG. 1 to FIG. 8. In respective drawings, the same symbols are given to the same or corresponding parts and explanation thereof is omitted.

Figure 1:
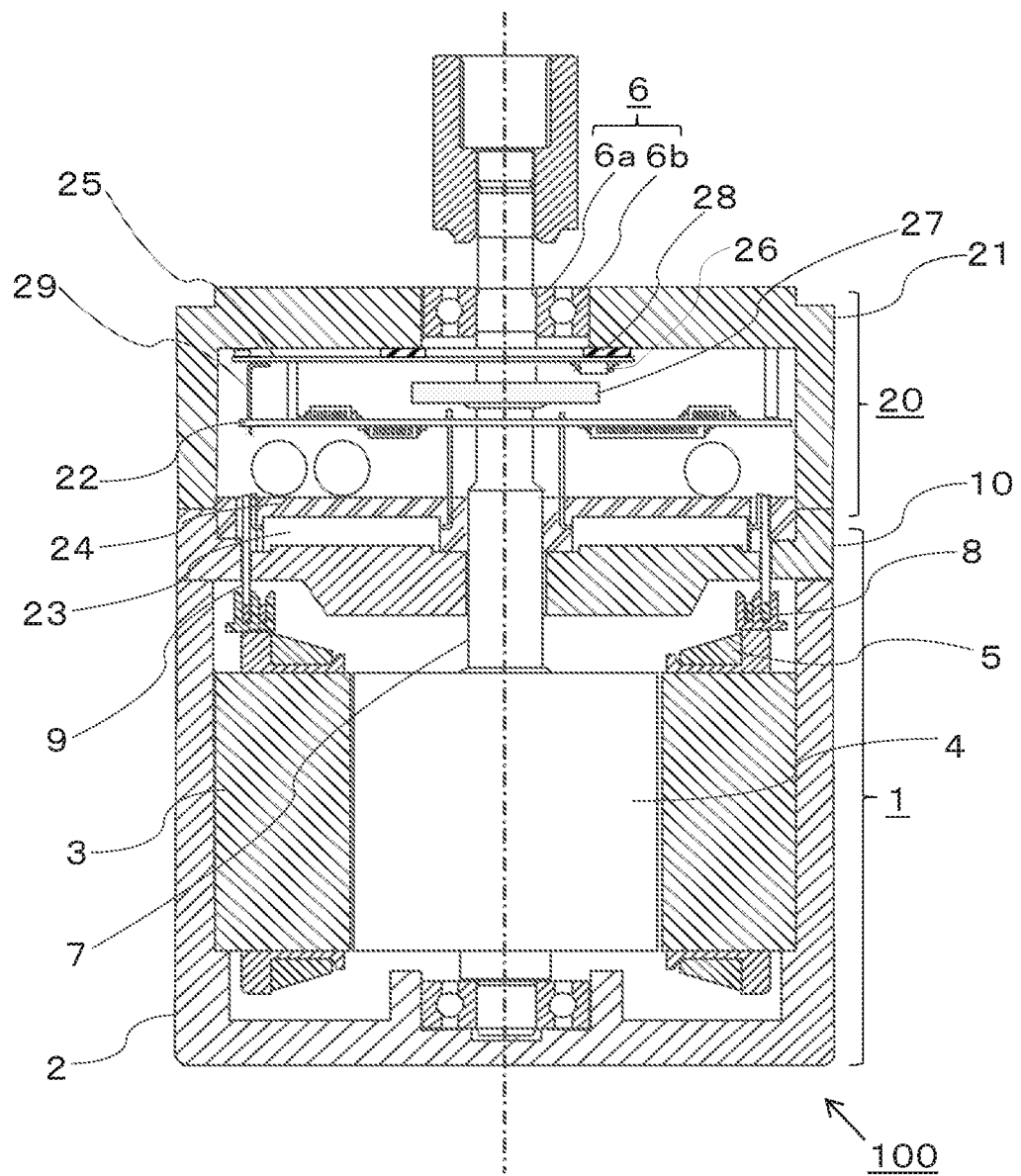
FIG. 1 is a cross-sectional side view of an electric rotating machine according to Embodiment 1 of the present invention.

FIG. 1 is a cross-sectional side view of an electric rotating machine 100, showing, for example, an electric power steering device. The electric rotating machine 100 has a structure in which a motor 1 and a control unit 20 are integrated. Then, the motor 1 is arranged on an end side (lower side of the page) of an output shaft 7 and the control unit 20 is coaxially arranged on an output side (upper side of the page) of the output shaft 7 as illustrated in FIG. 1.

The motor 1 includes a yoke 2, a stator 3, a rotor 4 and the like as main components. The stator 3 around which a winding coil is wound is arranged inside the yoke 2. Coil ends 5 forming end portions of the winding coil are positioned on both ends of the stator 3, and winding terminals 9 are extended from the coil ends 5 to the outside of the motor 1 through ring-shaped supporting portions 8.

The output shaft 7 is arranged in the central portion of the stator 3, and the rotor 4 fixed to the output shaft 7 is disposed on an inner peripheral side of the stator 3. The rotor 4 is provided with permanent magnets.

The output shaft 7 is rotatably supported by bearings 6 provided at an upper part and a lower part of the electric rotating machine 100 in FIG. 1. A bearing 6 is configured to hold balls by an inner ring 6a fixed to the output shaft 7 and an outer ring 6b fixed to a case 21.

The motor 1 is covered by a frame 10 at an upper part thereof. A lower portion from the frame 10 corresponds to the motor 1.

In a case where the motor 1 is a brushless three-phase motor, winding terminals 9 corresponding to at least three phases are inserted into holes of the frame 10 and extend to the upper side in the drawing.

The control unit 20 forming the electric rotating machine 100 is provided on the output side of the output shaft 7, namely, above the frame 10 of the motor 1. The case 21 forming the control unit 20 so as to surround the output shaft 21 is provided so as to have the same diameter as the yoke 2, and a control substrate 22 forming a circuit portion is provided there inside. The control substrate 22 is provided with a CPU, outputting a control signal for driving the motor 1.

In FIG. 1, power portions 23 for supplying electric current to the winding coil of the motor 1 by receiving a control signal from the control substrate 22 are arranged under the control substrate 22. When the motor 1 is the brushless three-phase motor, many switching devices are mounted on the power portions 23 in a bridge configuration. The total number of two power portions 23 are arranged on right and left sides in FIG. 1. In the power portions 23, heat is generated due to control of the switching devices for supplying electric current to the motor 1, and a configuration of radiating heat by using the frame 10 as a heatsink is adopted. The winding terminals 9 penetrating the frame 10 (heat sink) are connected to terminals of the power portions 23, and the connection is performed by, for example, welding. A plurality of terminals are further extended from the power portions 23 to the control substrate 22, and the above-described control signal is transmitted to the terminals.

An intermediate member 24 formed of an insulating member is arranged between the control substrate 22 and the power portions 23. Conductors such as power supply lines (+, −) to the power portions 23 are inserted into the intermediate member 24. Furthermore, components such as capacitors are arranged in a space between the intermediate member 24 and the control substrate 22 to thereby use the space effectively.

The output shaft 7 passes through the center of the control unit 20 and penetrates the case 21 to be extended to the outside. A tip end of the output shaft 7 is fitted to a reduction gear (not shown). It is important particularly for the brushless motor to detect a rotational state of the output shaft 7. It is found that, when detection accuracy of the rotational angle is not good, detection accuracy of a rotational position calculated from the rotational angle is also deteriorated, which affects smoothness of rotation of the motor 1. Accordingly, a rotation sensor 26 for detecting the rotational state of the output shaft 7 is a design item in which detection accuracy is important. Additionally, a factor of size reduction is included in requirements to be fulfilled by the rotation sensor 26 as described above.

In the control unit 20, a sensor magnet 27 for generating a magnetic field for detecting the rotational angle is arranged. As the motor 1 and the control unit 20 are integrated to reduce the size in the electric rotating machine 100 according to the structure, it is difficult to attach the sensor magnet 27 at an end of the output shaft 7, and the sensor magnet 27 is arranged in an intermediate part. The sensor magnet 27 is not allowed to be arranged close to the power portions 23 where drive current of the motor 1 flows for improving detection accuracy of the rotational angle and for suppressing noise. Accordingly, the sensor magnet 27 is arranged on a surface of the control substrate 22 on the opposite side (upper side in FIG. 1) of the power portions 23.

Figure 2:
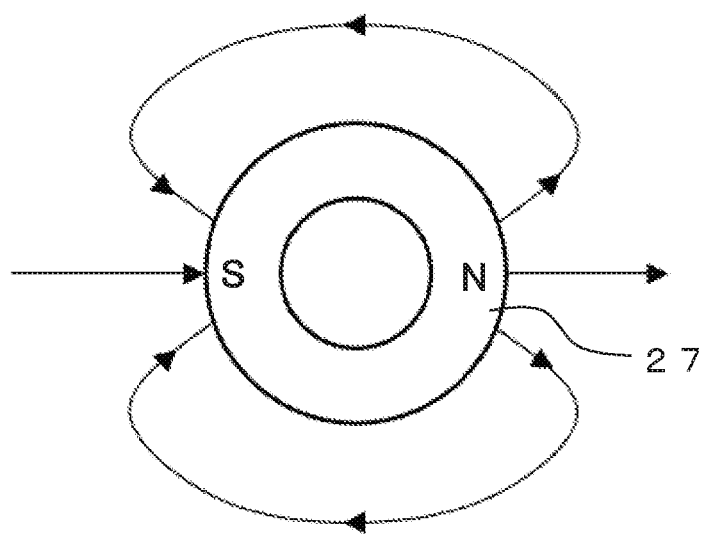
FIG. 2 is a plan view of a sensor magnet of the electric rotating machine according to Embodiment 1.

FIG. 2 shows a plan view of the sensor magnet 27. The sensor magnet 27 is annular in planar shape, which is a plate-shaped member having a uniform thickness. As shown in FIG. 2, N-pole and S-pole are magnetized in a circumferential direction around an axial direction of the output shaft 7. Though a case of one polar pair is explained here, the same applies to a case of multiple polar pairs. The rotation sensor 26 that detects magnetic fields of the N and S poles is arranged above the sensor magnet 27 as shown in FIG. 1.

Here, it can be also considered that the rotation sensor 26 is arranged on the control substrate 22 side seen from the sensor magnet 27 or arranged on the control substrate 22, in the axial direction of the output shaft 7. However, the magnetic body for realizing a magnetic field in a desired direction component is necessary for detecting variation in intensity of the magnetic field. Such structure can be adopted in a case where there is a space for arranging the magnetic body on the control substrate 22 side or on the control substrate 22.

In this case, a case where the magnetic body 28 is not arranged on the control substrate 22 side seen from the sensor magnet 27 and is arranged on an upper side of the sensor magnet 27 where the control substrate 22 is not provided as shown in FIG. 1 for reducing the size of the apparatus will be explained.

The case 21 in which the magnetic body 28 is housed is an aluminum-based nonmagnetic body, not an iron-based magnetic body. Then, the annular magnetic body 28 (for example, made of iron) is attached inside the case 21. Moreover, a sensor substrate 25 provided with the rotation sensor 26 is arranged on a lower side of the magnetic body 26 in FIG. 1. The sensor substrate 25 and the control substrate 22 are connected by electric wiring 29 for power supply to the rotation sensor 26 and for transmitting/receiving detection signals and soon from the sensor.

Part of the magnetic flux in the N-pole of the sensor magnet 27 reaches the magnetic body 28. The rotation sensor 26 is arranged in an intermediate part between the sensor magnet 27 and the magnetic body 28.

Figure 3:
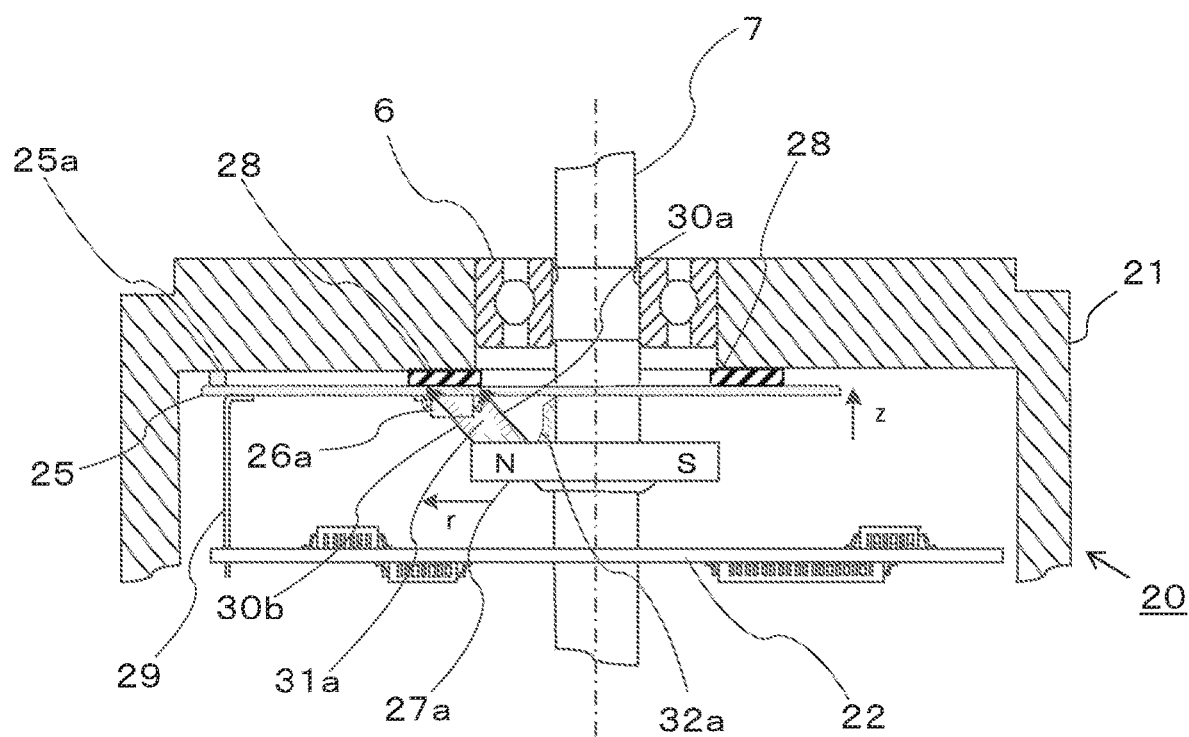
FIG. 3 is a cross-sectional side view showing a control unit of the electric rotating machine according to Embodiment 1.

The arrangement of a rotation sensor 26a in a case where an outer diameter of a sensor magnet 27a is smaller than an outer diameter of the magnetic body 28 will be explained in detail with reference to FIG. 3. FIG. 3 is a cross-sectional side view of the control unit 20 of the electric rotating machine 100 of FIG. 1, showing an enlarged view in the vicinity of an arrangement area of the rotation sensor 26a. The outer diameter of the sensor magnet 27a is smaller than the outer diameter of the magnetic body 28. In magnetic fields generated toward the magnetic body 28 from the sensor magnet 27a, an effective area 31a of the magnetic flux in which the rotational angle can be detected with high accuracy by the rotation sensor 26a can be represented by a rectangular shape as shown in FIG. 3. The effective range 31a corresponds to an area determined in accordance with the intensity of the magnetic field for detecting the rotational angle.

That is, when the rotation sensor 26a is arranged in the effective range 31a, a detection error of the rotational angle of the output shaft 7 can be reduced. Part of the rotation sensor 26a is a detection part, and it does not matter if portions other than the detection part of the rotation sensor 26a are arranged so as to protrude from the effective range 31a as long as the detection part is arranged within the effective range 31a.

As shown in FIG. 3, the effective range 31a corresponds to a rectangular range surrounded by an arrow 30b extended from an outer periphery (the maximum circumferential edge) of the sensor magnet 27a to an outer peripheral part of the magnet body 28 and an arrow 30a extended from a certain position in an inner periphery of the sensor magnet 27a to an inner peripheral edge of the magnetic body 28.

In the case where an outer diameter of the sensor magnet 27 is smaller than an outer diameter of the magnetic body 28, the rotation sensor 26a can be arranged on an outer side of a range in which the sensor magnet 27 is projected in a radial direction.

Next, a method of determining the effective range 31a will be explained.

An arrow "z" in FIG. 3 represents an axial direction (z-direction) of the output shaft and an arrow "r" represents a radial direction (r-direction) of the sensor magnet 27a. A direction from the back of the page toward this side corresponds to a circumferential direction (θ-direction), and the sensor magnet 27a rotates in the θ-direction.

In FIG. 3, the rotation sensor 26a and the sensor substrate 25 serving as a support substrate are displayed by virtual lines as arrangements of them are determined in accordance with the intensity of the magnetic field for detecting the angle.

First, the arrangement of the rotation sensor 26a in the z-direction has relation to a distance between the sensor magnet 27a and the magnetic body 28 and determined based on Coulomb's law in which the intensity of the magnet field is in proportion to a product of intensities of magnetic poles and in inverse proportion to a square of the distance.

A distance of the rotation sensor 26a from the sensor magnet 27a in the z-direction is determined as a distance in which the intensity of the magnetic field (magnetic flux density) can be secured, therefore, the maximum distance is naturally determined. That is, the distance between the magnetic body 28 and the sensor magnet 27a is preferably within a range in which the magnetic body 28 can sufficiently attract the magnetic flux. The rotation sensor 26a is provided on the sensor substrate 25, and when the distance in the z-direction is determined, height adjustment of the sensor substrate 25 can be performed by using a leg portion 25a or the like for arranging the sensor substrate 25 in the effective distance.

Next, a boundary line connecting between the outermost peripheral edge of the sensor magnet 27a (magnetic pole) and the outer peripheral side of the magnetic body 28 represented by the arrow 30b can be determined by considering that the magnetic field is attenuated with a square of the distance in the same manner as in the case of the arrow "z". Accordingly, the effective range 31a is not used in a range of the outer peripheral edge of the magnetic field 28.

Figure 4:
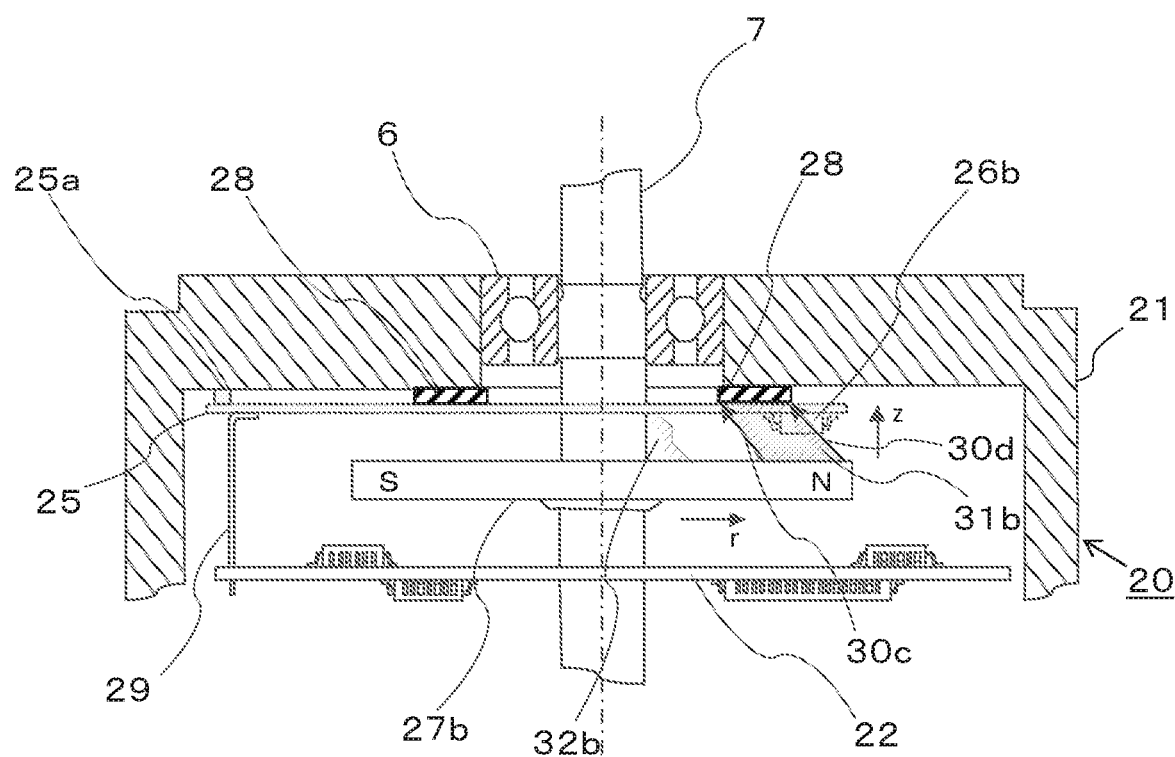
FIG. 4 is a cross-sectional side view showing a control unit of the electric rotating machine according to Embodiment 1.

Similarly to the above, the arrangement of a rotation sensor 26b in a case where an outer diameter of a sensor magnet 27b is larger than the outer diameter of the magnetic body 28 will be explained in detail. FIG. 4 is a cross-sectional side view of the control unit 20 of the electric rotating machine 100 of FIG. 1, showing an enlarged view in the vicinity of an arrangement area of the rotation sensor 26b. The arrangement of the rotation sensor 26b will be explained in detail with reference to FIG. 4. The outer diameter of the sensor magnet 27b is larger than the outer diameter of the magnetic body 28. In magnetic fields generated toward the magnetic body 28 from the sensor magnet 27b, an effective area 31b of the magnetic flux in which the rotational angle can be detected with high accuracy by the rotation sensor 26b can be represented by a rectangular shape as shown in FIG. 4.

That is, when the rotation sensor 26b is arranged in the effective range 31b, a detection error of the rotational angle can be reduced. The effective range 31b may be determined in the same manner as the effective range 31a. As shown in FIG. 4, the effective range 31b corresponds to a rectangular range surrounded by an arrow 30d extended from an outer peripheral edge of the sensor magnet 27b to an outer peripheral part of the magnet body 28 and an arrow 30c extended from a certain position in an inner periphery of the sensor magnet 27b to an inner peripheral edge of the magnetic body 28 as shown in FIG. 4. The effective range 31b corresponds to an area determined in accordance with the intensity of the magnetic field for detecting the rotational angle.

In the case where the outer diameter of the sensor magnet 27 is larger than the outer diameter of the magnetic body 28, the rotation sensor 26b can be arranged within a range in which the sensor magnet 27 is projected.

When the arrangement of the rotation sensor 26 (26a/26b) is determined, it is necessary to determine a boundary line on the inner peripheral side of the effective range 31a/31b by considering that there is a suitable relationship between the radial direction "r" and the circumferential direction θ of the magnetic field.

Here, as the magnetic sensor used as the rotation sensor 26, for example, a MR element exists. The MR element is a magnetic resistance element, in which a magnetic resistance value thereof is increased almost in proportion to the magnetic flux density. Two such magnetic resistance elements are connected in series, and voltages appearing at both ends of a device such as a magnet in which electric resistance varies with the magnetic field are detected. When the magnetic field is applied equally to the both resistance elements, the median value (midpoint voltage) is obtained. When the magnetic field is applied with difference, not equally, the median voltage changes. Therefore, the rotational angle of the output shaft 7 can be calculated from the detected voltages. As the rotation sensor 26 has two magnetic resistance elements having different direction components to be detected, one can be detected as a sine signal V sin and the other can be detected as a cosine signal V cos. The case where the rotation sensor 26 having two magnetic resistance elements connected in series are used will be explained here, however, the same naturally applies to other cases as long as the magnetic resistance elements are used.

A magnetic flux density B can be expressed as a vector having three direction components, and a radial-direction component $B_r$, a circumferential-direction component $B_\theta$ and an axial direction component $B_z$ are given by the following expression (1).

[Expression 1]

$$\begin{cases} B_r = a_{r1}\cos\theta \\ B_\theta = b_{\theta1}\sin\theta \end{cases} \quad (1)$$

Relations between V cos and V sin as well as between Br and Bθ are given by the following expression (2).

[Expression 2]

$$\begin{cases} V_{cos} = K\dfrac{B_r}{\sqrt{B_r^2 + B_\theta^2}} = \dfrac{Ka_{r1}\cos\theta}{\sqrt{\dfrac{a_{r1}^2 + b_{\theta1}^2}{2}}} \dfrac{1}{\sqrt{1 + \dfrac{a_{r1}^2 - b_{\theta1}^2}{a_{r1}^2 + b_{\theta1}^2}\cos2\theta}} \\ V_{sin} = K\dfrac{B_\theta}{\sqrt{B_r^2 + B_\theta^2}} = \dfrac{Kb_{\theta1}\sin\theta}{\sqrt{\dfrac{a_{r1}^2 + b_{\theta1}^2}{2}}} \dfrac{1}{\sqrt{1 + \dfrac{a_{r1}^2 - b_{\theta1}^2}{a_{r1}^2 + b_{\theta1}^2}\cos2\theta}} \end{cases} \quad (2)$$

When amplitudes of Br and Bθ are equal, denominators in Expression (2) are a fixed value $a_{r1}$, however, when the amplitudes are different, denominators vary. When an expression including a square root in a denominator is Taylor-expanded, the expression can be expanded as shown in the following expression (3), therefore, V cos and V sin are given by the following expression (4).

[Expression 3]

$$\dfrac{1}{\sqrt{1+x}} = 1 - \dfrac{x}{2} + \dfrac{3x^2}{8} - \dfrac{5x^3}{16} + \dfrac{35x^4}{128} - \dfrac{63x^5}{256} + \dfrac{231x^6}{1024} + \ldots \quad (3)$$

[Expression 4]

$$\begin{cases} V_{cos} = a_{c1}\cos\theta + a_{c3}\cos3\theta + a_{c5}\cos5\theta + a_{c5}\cos7\theta + \ldots \\ V_{sin} = b_{s1}\sin\theta + b_{s3}\sin3\theta + b_{s5}\sin5\theta + b_{s5}\sin7\theta + \ldots \end{cases} \quad (4)$$

That is, when an amplitude ratio of the Br and Bθ is not equal to "1", an odd-order error component is superimposed on V cos and V sin.

An angle error "e" is given by an approximate expression shown by the following expression (5).

[Expression 5]

$$e \approx \dfrac{1}{2a_{c1}} \{(-a_{c1} + b_{s1} + a_{c3} + b_{s3})\sin2\theta + (-a_{c3} + b_{s3} + a_{c5} + b_{s5})\sin4\theta + \ldots \} \quad (5)$$

As the odd-order signal error component is expressed as an even-order angle error, the larger a high-order error component included in the signal is, the larger a high-order error appearing in the detected angle becomes. Therefore, the detection accuracy of the rotational angle can be improved as both the sine signal V sin and the cosine signal V cos detected by the rotation sensor 26 have waveforms with small distortion.

Waveforms of Br and Bθ corresponding to amplitude ratios (1.0, 1.2, 1.8) between Br and Bθ, and waveforms of V cos and V sin are shown in FIG. 5A, FIG. 5B, FIG. 6A, FIG. 6B, FIG. 7A and FIG. 7B.

Figures 5A, 5B:
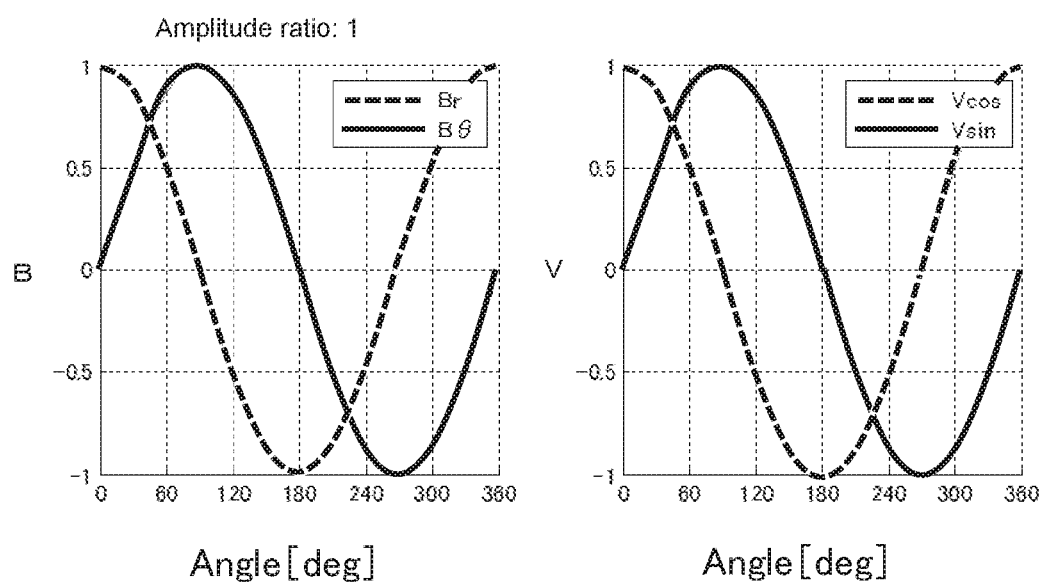
FIG. 5A is a chart showing angular dependence of a magnetic flux density in a case where an amplitude ratio between a radial-direction component Br and a circumferential-direction component Bθ in a magnetic flux density B of a magnetic field generated in the electric rotating machine is "1"
FIG. 5B is a chart showing angular dependence of signal values of a sine signal V sin and a cosine signal V cos.

FIG. 5A shows angular dependence of the magnetic flux density B between Br and Bθ obtained when the amplitude ratio between Br and Bθ is 1:1, namely, amplitudes are equal. FIG. 5B shows angular dependence of signal values V of V cos and V sin in that case.

Figures 6A, 6B:
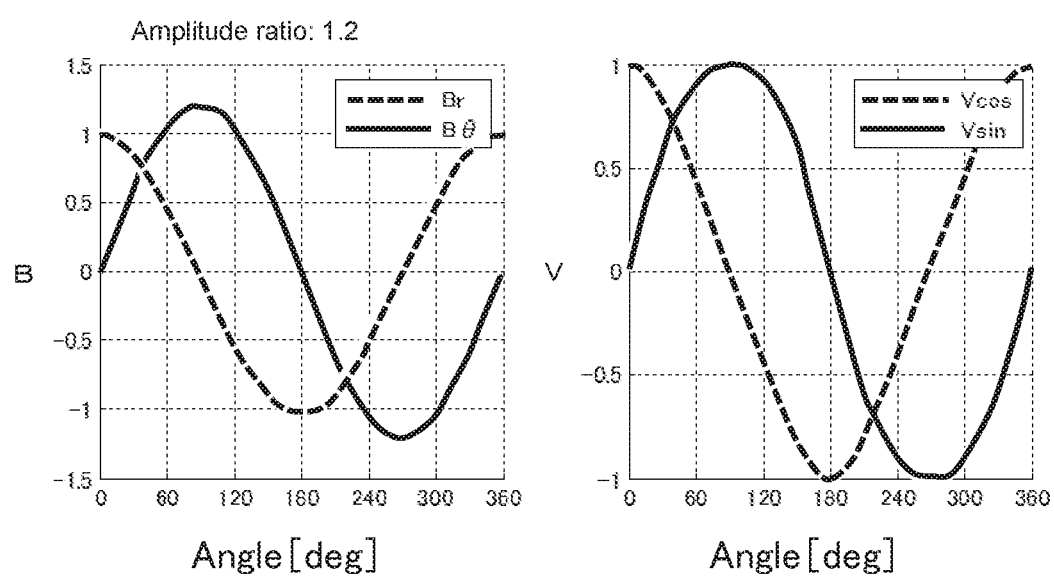
FIG. 6A is a chart showing angular dependence of a magnetic flux density in a case where the amplitude ratio between the radial-direction component Br and the circumferential-direction component Bθ in a magnetic flux density B of the magnetic field generated in the electric rotating machine is "1.2"
FIG. 6B is a chart showing angular dependence of signal values of a sine signal V sin and a cosine signal V cos.

FIG. 6A shows angular dependence of the magnetic flux density B between Br and Bθ obtained when the amplitude ratio between Bθ and Bθ is 1:1.2. FIG. 6B shows angular dependence of the signal values V of V cos and V sin in that case.

Figures 7A, 7B:
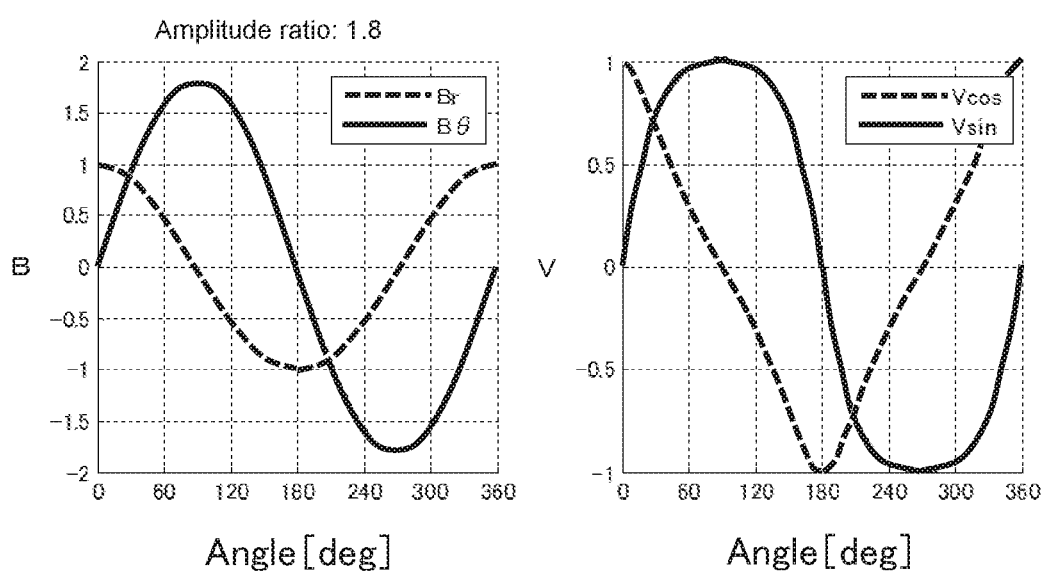
FIG. 7A is a chart showing angular dependence of a magnetic flux density in a case where the amplitude ratio between the radial-direction component Br and the circumferential-direction component Bθ in a magnetic flux density B of the magnetic field generated in the electric rotating machine is "1.8"
FIG. 7B is a chart showing angular dependence of signal values of a sine signal V sin and a cosine signal V cos.

FIG. 7A shows angular dependence of the magnetic flux density B between Br and Bθ obtained when the amplitude ratio between Br and Bθ is 1:1.8. FIG. 7B shows angular dependence of the signal values V of V cos and V sin in that case.

As apparent from FIG. 5A, FIG. 5B, FIG. 6A, FIG. 6B, FIG. 7A and FIG. 7B, it is found that, when the amplitude ratio between Br and Bθ is "1" and the amplitudes are basically equivalent, there is no distortion in the sine signal V sin and the cosine signal V cos, and when the amplitude ratio is different from "1", there is distortion in the sine signal and the cosine signal. This is because high-frequency components in Expression (4), particularly, odd-orders of third-order, fifth-order and seventh-order components are increased, as a result, an angle error is generated when the amplitude of Br and Bθ are not equivalent.

There is a case where required detection accuracy of the rotational angle differs according to specifications of the device, and the ratio between "r" and θ can be determined based on the required accuracy. For example, when the ratio of amplitudes is 1 to 1.2 as shown in FIG. 5A and FIG. 5B, FIG. 6A and FIG. 6B, it is determined that the accuracy is satisfied, and devices corresponding to the amplitude ratios can be used. Then, when the amplitude ratio is 1.8 as shown in FIG. 7A and FIG. 7B, it is determined that the accuracy is not satisfied and that devices corresponding to the amplitude ratio are not suitable to be used. Accordingly, an allowable range corresponding to specifications is determined based on the amplitude ratio between Br and Bθ.

As order components of V cos, V sin and the angular error are functions by an amplitude ratio "k", the amplitude ratio "k" is preferably within a range satisfying the following expression (6) when an angle error component of n-order ("n" is an even number) is expressed as fn(k) and the required rotational angle detection accuracy is expressed as E.

[Expression 6]

$$f_n(k) \leq E \quad (6)$$

For example, a case where the amplitude ratio "k" is about 1.2 will be explained. In this case, V cos and V sin are expressed as the following expression (7).

[Expression 7]

$$\begin{cases} V_{cos} = \dfrac{Kk\cos\theta}{\sqrt{\dfrac{k^2+1}{2}}} \dfrac{1}{\sqrt{1+\dfrac{k^2-1}{k^2+1}\cos 2\theta}} \\ V_{sin} = \dfrac{K\sin\theta}{\sqrt{\dfrac{k^2+1}{2}}} \dfrac{1}{\sqrt{1+\dfrac{k^2-1}{k^2+1}\cos 2\theta}} \end{cases} \quad (7)$$

In this case, when the expression is expanded by performing approximation by using up to the third term of the expression (3) for simplification, V cos and V sin are given by the following expression (8).

[Expression 8]

$$\begin{cases} V_{cos} \approx \dfrac{Kk}{2^{\frac{9}{2}}(k^2+1)^{\frac{5}{2}}}\{(30k^4+52k^2+46)\cos\theta + \\ \quad (-5k^4-6k^2+11)\cos 3\theta + (3k^4-6k^2+3)\cos 5\theta\} \\ V_{sin} \approx \dfrac{K}{2^{\frac{9}{2}}(k^2+1)^{\frac{5}{2}}}\{(46k^4+52k^2+30)\sin\theta + \\ \quad (-11k^4-6k^2+5)\sin 3\theta + (3k^4-6k^2+3)\sin 5\theta\} \end{cases}$$

In this case, the angle error "e" is given by the following expression (9).

[Expression 9]

$$e \approx \dfrac{(k-1)\{-(35k^4+58k^2+35)\sin 2\theta + 8(k^4-1)\sin 4\theta - (3k^4-6k^2+3)\sin 6\theta\}}{2k(30k^4+52k^2+46)} \quad (9)$$

That is, the order components fn(k) of the angle error can be expressed by the following expression (10).

[Expression 10]

$$\begin{cases} f_2(k) = -\dfrac{(k-1)(35k^4+58k^2+35)}{2k(30k^4+52k^2+46)} \\ f_4(k) = \dfrac{8(k-1)(k^4-1)}{2k(30k^4+52k^2+46)} \\ f_6(k) = -\dfrac{(k-1)(3k^4+6k^2+3)}{2k(30k^4+52k^2+46)} \end{cases} \quad (10)$$

In order to set theses errors to be values satisfying the required rotational angle detection accuracy E, it is necessary to set the amplitude ratio "k" within ranges determined by the following expression (11).

[Expression 11]

$$\begin{cases} f_2(k) \leq E \\ f_4(k) \leq E \\ f_6(k) \leq E \end{cases} \quad (11)$$

Though the allowable ranges are determined by second-order, fourth-order and sixth-order components in this case, it is preferable that only order components which are not correction targets are corrected in low-order components when reduction is performed by a well-known correction method. In the case where the amplitude ratio is high, the angle error "e" is preferably estimated by considering further higher order components. As a low-order component is the highest in order component errors to be considered for determining the range, it is also preferable to set the component to be lower than the required rotational angle detection accuracy E.

Figure 8:
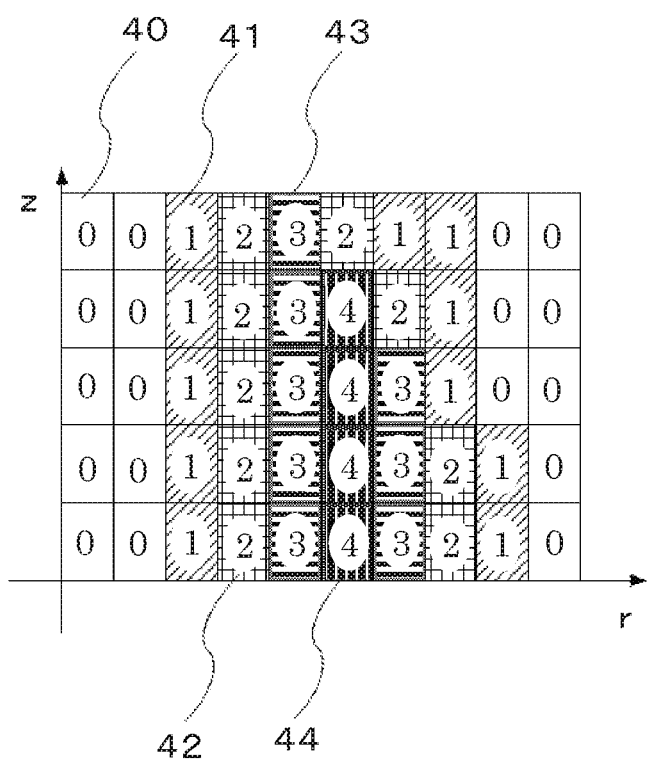
FIG. 8 is a schematic diagram showing angle detection accuracy on coordinates in an axial direction and a radial direction of the electric rotating machine.

Furthermore, FIG. 8 is a schematic diagram in which an original point is set to a height of an upper surface (surface on the magnetic body 28 side) of the sensor magnet 27 in the axial direction of the output shaft and sections with the same size are allocated to both distance coordinates in the axial direction "z" and the radial direction "r" to indicate the rotational angle detection accuracies in corresponding sections. In respective sections, accuracy levels corresponding to the rotational angle detection accuracies are shown by numerals. These numerals are increased as the rotational angle detection accuracy becomes high.

In FIG. 8, a case where the accuracy levels in rotational angle detection accuracy are shown in five stages is cited as an example. In an area 40 where the rotational angle detection accuracy is low (error is large), a numeral "0" is displayed in a space with no hatching. In an area 41 where the rotational angle detection accuracy is lower after the area 40, a numeral "1" is displayed in a space with hatching of oblique lines. In an area 42 where the rotational angle detection accuracy is lower after the area 41, a numeral "2" is displayed in a space with hatching of a lattice. In an area 43 where the rotational angle detection accuracy is lower after the area 42, a numeral "3" is displayed in a space with hatching of horizontal stripes. In an area 44 where the rotational angle detection accuracy is the highest (almost no error), a numeral "4" is displayed in a space with hatching of vertical stripes.

Then, whether only the areas 43 and 44 can be used for arranging the rotation sensor 26 or even the area 42 can be used according to the accuracy required by the electric rotating machine 100 is determined by referring to data of FIG. 8. Then, the rotational angle detection error of the rotation sensor 26 can be reduced by arranging the rotation sensor 26 in the predetermined effective range.

According to the above results, the arrangement of the sensor magnet 27 and the rotation sensor 26 will be qualitatively explained as follows.

The magnetic field proceeds from the sensor magnet 27 directly to the output shaft 7 without passing through the magnetic body 28 in the vicinity of the output shaft 7. Accordingly, it is difficult to use areas 32a, 32b in the vicinity of the sensor magnet 27 and the output shaft 7 shown in FIG. 3 and FIG. 4 for arranging the rotation sensor 26a. Areas between the areas 32a, 32b and the effective ranges 31a, 31b are unusable areas because the r-direction component is larger than the θ-direction component due to the relationship between Br and Bθ and thus the sine signal and the cosine signal are distorted. The effective ranges 31a, 31b are areas (areas having the relation of Br:Bθ≈1:1) where the rotational angle detection accuracy is good which are obtained by considering all of "z", "r" and θ.

The boundary lines (arrows 30a, 30b, 30c and 30d) of the effective ranges 31a, 31b are shown by slant lines in FIG. 3 and FIG. 4, however, the present invention is not limited to this. For example, respective direction components of the magnetic flux density B vary according to the distance between the sensor magnet 27 and the magnetic body 28, therefore, the effective ranges 31a, 31b vary according to the distance between the sensor magnet 27 and the rotation sensor 26 in the z-direction. Then, the smaller the distance between the sensor magnet 27 and the rotation sensor 26 in the z-direction is, the smaller an angle made by the line (arrow 30a) in the inner peripheral side of the effective range 31a and Z-axis and an angle made by the line (arrow 30b) in the outer peripheral side of the effective range 31b and Z-axis become.

That is, in a case where the effective range 31a is used by placing the rotation sensor 26a on the outer side from the outer periphery of the sensor magnet 27 as shown in FIG. 3, the amplitude ratio between Br and Bθ can be brought close to "1" and the rotational angle detection error can be reduced when the rotation sensor 26a is arranged in the inner peripheral side as the distance in the z-direction is reduced.

On the other hand, in a case where the effective range 31b is used by placing the rotation sensor 26b on the inner side from the outer periphery of the sensor magnet 27 as shown in FIG. 4, the amplitude ratio between Br and Bθ can be brought close to "1" and the rotational angle detection error can be reduced when the rotation sensor 26b is arranged in the outer peripheral side as the distance in the z-direction is reduced.

As described above, arrangements of the sensor magnet 27, the rotation sensor 26 and the magnetic body 28 are determined by considering "z", "r" and θ to improve the rotational angle detection accuracy, thereby obtaining advantages of improvement in rotation accuracy of the output shaft and improvement in noise tolerance. When the magnetic body 28 is arranged also by considering the effective ranges 31a, 31b as the areas where the rotational angle detection error is reduced, it is not necessary to increase the size of the magnetic body 28 itself wastefully and reduction in weight and size can be realized.

The annular magnetic body 28 has a structure that is sandwiched between an inner surface of the case 21 and the sensor substrate 25, in which the leg portion 25a having the same height as the magnetic body 28 is fixed inside the case 21 and the sensor substrate 25 is fixed to the leg portion 25a to thereby arrange the magnetic body 28 between the both members. Note that the magnetic body 28 can be used also as the leg portion for fixing the sensor substrate 25 by forming the leg portion 25a to have the same thickness as the magnetic body 28, which can reduce the number of parts in this case.

As the size restriction of the magnetic body 28 in the thickness direction, there is no problem when the magnetic body 28 has a thickness in such degree that the magnetic flux density B from the sensor magnet 27 is not saturated. Though the annular magnetic body 28 has been explained here, the same effects can be obtained when the magnetic body 28 has a shape with a cutout portion as long as a magnetic circuit formed between the sensor magnet 27 and the magnetic body 28 is effective.

The example in which the MR element having more prominent effect is used as the rotation sensor 26 (26a, 26b) has been shown in Embodiment 1. Even when other elements such as a hall element are used, the rotational angle detection error of the output shaft 7 can be suppressed to be small by adopting the structure in which the rotation sensor 26 is arranged in the range where the amplitude ratio between Br and Bθ is good.

Moreover, the example in which the control unit 20 is arranged on the output side of the motor and the sensor magnet 27 and the rotation sensor 26 are attached thereinside is shown in FIG. 1, however, the arrangement of the rotation sensor 26 can be determined in the same manner even in a structure in which the control unit is arranged opposite to the output side of the output shaft 7, which is on the lower side of the drawing.

Embodiment 2

Figure 9:
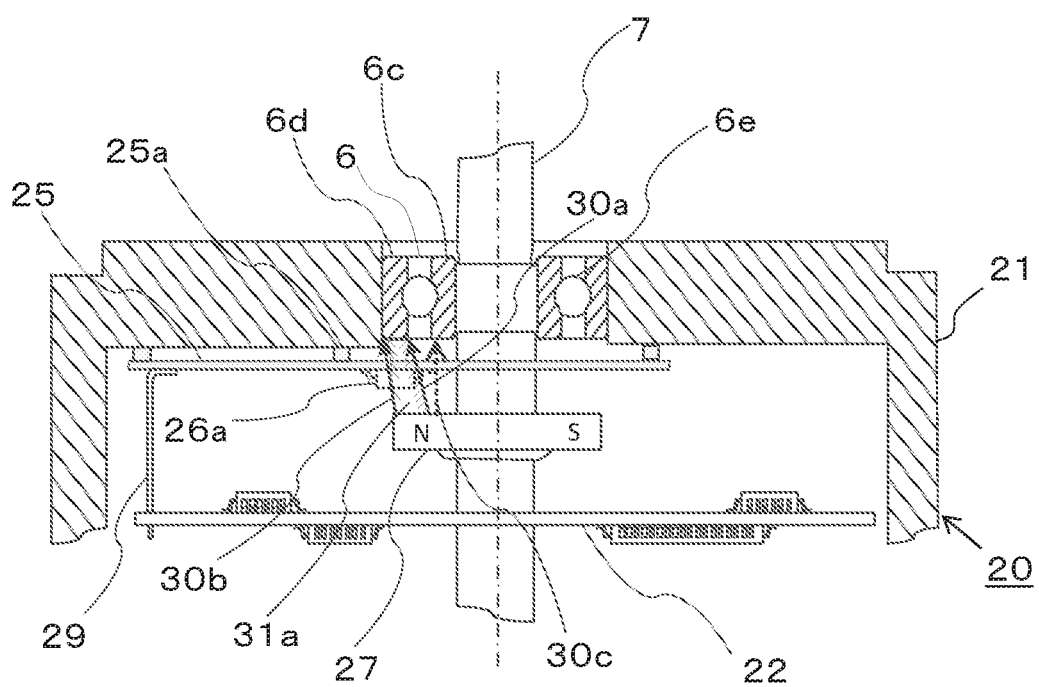
FIG. 9 is a cross-sectional side view showing a control unit of an electric rotating machine according to Embodiment 2 of the present invention.
Figure 10:
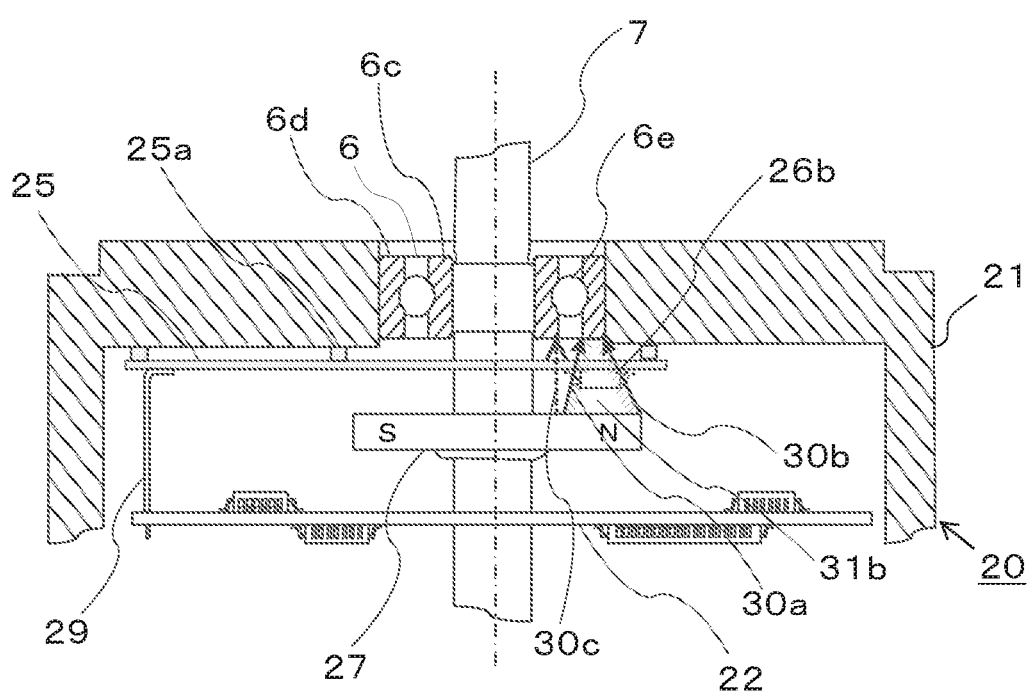
FIG. 10 is a cross-sectional side view showing a control unit of the electric rotating machine according to Embodiment 2 of the present invention.

Next, Embodiment 2 will be explained with reference to FIG. 9 and FIG. 10. FIG. 9 and FIG. 10 are cross-sectional side views of the control unit 20, showing the vicinity of arrangement areas of the rotation sensors 26a, 26b.

The example in which the magnetic body 28 is arranged is shown in the above Embodiment 1. An example in which the magnetic body 28 is not used and an outer ring 6d of the bearing 6 is used instead as a magnetic body is shown in FIG. 9 and FIG. 10. FIG. 9 shows a case where the outer diameter of the sensor magnet 27 is smaller than an outer diameter of the bearing 6, and FIG. 10 shows a case where the outer diameter of the sensor magnet 27 is larger than the outer diameter of the bearing 6.

As shown in FIGS. 9 and 10, the bearing 6 is held by the case 21 and the sensor magnet 21 is arranged close to the bearing 6. Then, the bearing 6 is arranged so that a lower surface thereof is approximately on the same height as an inner wall surface of the case 21 for reducing the distance between the bearing 6 and the sensor magnet 27 as compared with the case shown in FIGS. 3 and 4. An inner ring 6c and balls 6e of the bearing 6 rotate together with the output shaft 7, however, the outer ring 6d is fixed to the case 21 side and does not rotate.

The outer ring 6d has an annular shape similarly to the sensor magnet 27, having a fixed diameter. Moreover, the outer ring 6d is a magnetic body that is, for example, made of iron. Accordingly, the outer ring 6d is used instead of the magnetic body 28 according to Embodiment 1, which is made to have a function of collecting the magnetic field.

In Embodiment 2, arrangements of the rotation sensors 26a, 26b are determined in accordance with the arrangement of the outer ring 6d.

First, as shown in FIG. 9 and FIG. 10, as an area where it is difficult to arrange the rotation sensors 26a, 26b, there is an area between a broken-line arrow 30c extending from the sensor magnet 27 to an outer periphery of the inner ring 6c so as to be in parallel to the axial direction of the output shaft 7 and the output shaft 7, which is an arrangement prohibited area in which relationship between "r" and 6 according to Embodiment 1 is considered. Similarly, an area on an outer peripheral side of an arrow 30b extending from an outer peripheral part of the sensor magnet 27 to an outer periphery (the outermost peripheral edge) of the outer ring 6d is also an arrangement prohibited area.

An arrow 30a extending from the sensor magnet 27 to an inner periphery (innermost peripheral edge) of the outer ring 6d of the bearing 6 may be set so as to form an area having the relation of Br:Bθ=1:1 in the same manner as the above Embodiment 1. Then, the rotation sensors 26a, 26b can be arranged on an area of an effective range 31b having a rectangular shape surrounded by the arrows 30a, 30b, the sensor magnet 27 and the outer ring 6d.

The performance of the bearing 6 is determined and the size of the bearing 6 is determined by a thickness of the output shaft 7 and a rotation torque of the output shaft 7. Accordingly, the arrow 30a on the inner peripheral side of the effective ranges 31a, 31b is positioned on a line connecting a position on the sensor magnet 27 as a contact point of the broken-line arrow 30c and the inner periphery of the outer ring 6d.

Here, the outer ring 6d has an annular shape which is the same as the sensor magnet 27. Then, it is necessary that the outer ring 6d and the sensor magnet 27 have smooth surface shapes without roughness in which smoothing at corner portions is not performed, in which the inner diameter and the outer diameter do not vary depending on the z-direction.

In a case where corner portions on the outer surfaces of the outer ring 6d and the sensor magnet 27 are smooth curved surface with rounded corners, distances "z" and "r" in the outer ring 6d and the sensor magnet 27 are changed partially when there is roughness (dimension change) in the right and left direction (radial direction) and in the vertical direction on the page in FIG. 9 and FIG. 10.

As described above, there is a tendency that the outer diameter of the outer ring 6d is formed to be smaller than that of the magnetic body 28 according to Embodiment 1 in the present structure in which the outer ring 6d is used as the magnetic body, therefore, the effective areas 31a, 31b in which the rotation sensors 26a, 26b can be arranged are narrowed in width in the radial direction as shown in FIG. 9 and FIG. 10 as compared with the case in FIG. 3 and FIG. 4 of Embodiment 1.

In order to widen the effective ranges 31a, 31b, it is effective to widen a formation range of the magnetic body itself by adding a component contacting the outer ring 6d and functioning as the magnetic body or other methods. In order to realize the above, it is possible to increase a dimension in a width direction of a part functioning as the magnetic body to be larger than the case where only the outer ring 6d is used by, for example, attaching a cover formed of the magnetic body to the balls 6e, arranging the magnetic body 28 similar to Embodiment 1 in an outer peripheral direction on which the outer ring 6d abuts or by attaching another outer ring to the outer side of the outer ring 6d.

In Embodiment 1 and this Embodiment 2, the example in which the magnetic body 28 or the outer ring 6d of the bearing 6, the rotation sensor 26, the sensor magnet 27 and the power portions 23 are sequentially arranged in the axial direction of the electric rotating machine 100 is shown. However, it goes without saying that it is possible to arrange the sensor magnet 27, the rotation sensor 26, the magnetic body 28 and the power portions 23 in the axial direction in this order when satisfying the conditions that the rotation sensor 26 is arranged in the area where amplitudes of the radial-direction component Br and the circumferential-direction component Bθ in the magnetic flux density B of the magnetic field are equivalent and that the distance from the sensor magnet 27 is within the area determined in accordance with the intensity of the magnetic field for detecting the rotational angle.

Figure 11:
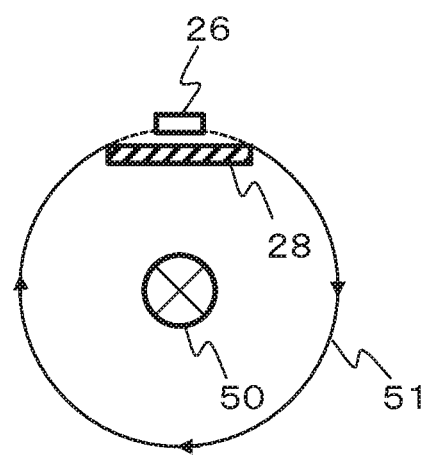
FIG. 11 is an explanatory view for the electric rotating machine according to Embodiment 1 and Embodiment 2 of the present invention, and is a schematic diagram showing that a magnetic field generated by electric current flowing in a power portion is shielded.

FIG. 11 is an explanatory view for the electric rotating machine 100 according to Embodiment 1 and Embodiment 2 of the present invention, which is a schematic diagram showing that a magnetic field 51 generated by electric current 50 flowing in the power portion 23 is shielded. As shown in FIG. 11, the electric current 51 generated by the electric current 50 flowing in the power portion 23 can be shielded by the magnetic body 28 (the outer ring 6d of the bearing 6 in Embodiment 2). When the rotation sensor 26 is arranged in the area where effects by the magnetic field 51 is reduced by the magnetic body 28 (outer ring 6d), effects of the magnetic field 51 on a detected value of the rotation sensor 26 can be reduced.

Though the example in which the magnetic body 28 (outer ring 6d) has the annular shape has been shown, explanation is made in FIG. 11 by using a model in which the magnetic body 28 is arranged only in the vicinity of the rotation sensor 26 for explaining variation of the magnetic field 51 according to the arrangement of the magnetic body 28.

The accuracy required for the rotational angle of the electric rotating machine 100 can be obtained by adjusting the size of the magnetic body 28 (outer ring 6d) though the degree of effects differ according to the magnitude of electric current flowing in the power portions 23, the distance between the rotation sensor 26 and the magnetic body 28 (outer ring 6d), the distance between the magnetic body 28 (outer ring 6d) and the power portions 23 and the intensity of the magnetic field 51 generated by the sensor magnet 27 in a place of the rotation sensor 26.

The case where one rotation sensor 26 is arranged in one electric rotating machine 100 has been explained in Embodiment 1 and Embodiment 2. However, a plurality of rotation sensors 26 can be arranged when there is an enough space inside the case 21 of the electric rotating machine 100, and a configuration in which a circuit is switched to another rotating sensor 26 when an abnormality occurs in one rotating sensor 26 can be adopted.

In the present invention, respective embodiments may be combined freely, and suitable modification and omission may occur in respective embodiments within a scope of the invention.

The invention claimed is:

1. An electric rotating machine comprising:
an output shaft of the electric rotating machine;
a magnetic body fixed inside a case of the electric rotating machine surrounding the output shaft;
a sensor magnet fixed to the output shaft and generating a magnetic field for detecting a rotational angle of the output shaft; and
a rotation sensor fixed inside the case of the electric rotating machine, arranged between the magnetic body and the sensor magnet in an axial direction of the output shaft and outputting a signal in accordance with the intensity of the magnetic field for detecting the rotational angle,
wherein N-pole and S-pole are magnetized in a circumferential direction around the output shaft in the sensor magnet, and
the rotation sensor is arranged in an area in which, when an amplitude ratio between a radial-direction component and a circumferential-direction component around the output shaft in a magnetic flux density of the magnetic field is "k", an n-order angle error fn (k) expressed by the amplitude ratio "k" satisfies a required rotational angle detection accuracy E,
wherein "n" is an even number.

2. The electric rotating machine according to claim 1, wherein the rotation sensor is arranged in an area in which a distance from the sensor magnet is determined in accordance with the intensity of the magnetic field for detecting the rotational angle in the axial direction of the output shaft.

3. The electric rotating machine according to claim 1, wherein the magnetic body is annular in planar shape and coaxially arranged with the output shaft so as to be apart from an outer periphery of the output shaft.

4. The electric rotating machine according to claim 1, wherein the sensor magnet is annular in planar shape and arranged so as to be inscribed in the outer periphery of the output shaft and so as to be extended in a radial direction, and
the rotation sensor is arranged within a range in which the sensor magnet is projected in the axial direction.

5. The electric rotating machine according to claim 1, wherein the sensor magnet is annular in planar shape and is arranged so as to be inscribed in the outer periphery of the output shaft and so as to be extended in a radial direction, and
the rotation sensor is arranged in an outer side of a range in which the sensor magnet is projected in the axial direction.

6. The electric rotating machine according to claim 1, wherein the output shaft is held by a bearing,
the bearing includes an inner ring rotating together with the output shaft and an outer ring not rotating, and
the outer ring is used as the magnetic body.

7. The electric rotating machine according to claim 1, wherein the output shaft is held by a bearing,
the magnetic body is arranged between the bearing and the rotation sensor, and
an outer diameter of the magnetic body is larger than an outer diameter of the bearing.

8. The electric rotating machine according to claim 1, wherein the rotation sensor is arranged in an inner side of an outer periphery of the magnetic body.

9. The electric rotating machine according to claim 1, wherein the magnetic body abuts on a sensor substrate (25) to which the rotation sensor is attached and an inner wall surface of the case.

10. The electric rotating machine according to claim 1, further comprising:
a frame for covering a stator and a rotor forming a motor of the electric rotating machine on an axis of the output shaft,
wherein a control substrate for controlling the electric rotating machine is arranged between the sensor magnet and the frame in the axial direction of the output shaft.

11. The electric rotating machine according to claim 1, further comprising:
a power portion for applying voltage to the electric rotating machine,
wherein the magnetic body, the rotation sensor, the sensor magnet and the power portion are arranged in this order in the axial direction.

12. The electric rotating machine according to claim 1, further comprising:
a power portion for applying voltage to the electric rotating machine,
wherein the sensor magnet, the rotation sensor, the magnetic body and the power portion are arranged in this order in the axial direction.

13. The electric rotating machine according to claim 1, wherein the electric rotating machine is used as a component of an electric power steering device.

* * * * *